Jan. 19, 1954

J. C. McCUNE 2,666,505

DISK BRAKE

Filed Aug. 12, 1948

3 Sheets-Sheet 1

INVENTOR.
Joseph C. McCune
BY
Frank E. Miller.
ATTORNEY

Jan. 19, 1954   J. C. McCUNE   2,666,505
DISK BRAKE

Filed Aug. 12, 1948   3 Sheets-Sheet 3

INVENTOR.
Joseph C. McCune
BY
Frank E. Miller,
ATTORNEY

Patented Jan. 19, 1954

2,666,505

UNITED STATES PATENT OFFICE 2,666,505

DISK BRAKE

Joseph C. McCune, Edgewood, Pa., assignor to Westinghouse Air Brake Company, a corporation of Pennsylvania Application August 12, 1948, Serial No. 43,913

12 Claims. (Cl. 188—153)

1

This invention relates to disk brake apparatus and more particularly to the fluid pressure controlled type for use on railway vehicles or the like.

One object of the invention is the provision of an improved relatively simple and inexpensive brake apparatus of the above type.

Another object of the invention is the provision of such a brake apparatus embodying improved means operable by hand for actuating same to apply brakes.

Other objects and advantages will become apparent from the following more detailed description of the invention.

Figure 1:
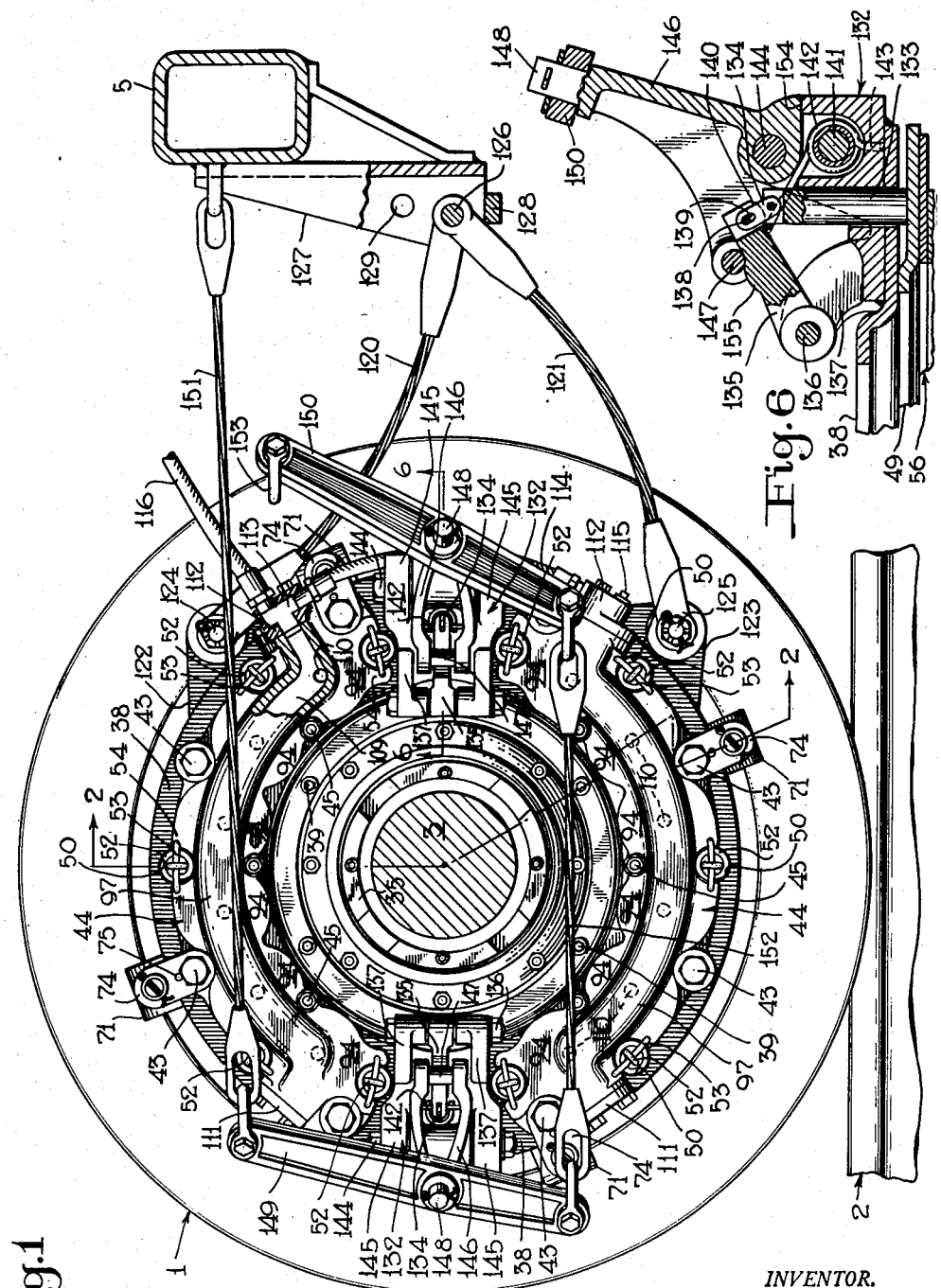
Figure 2:
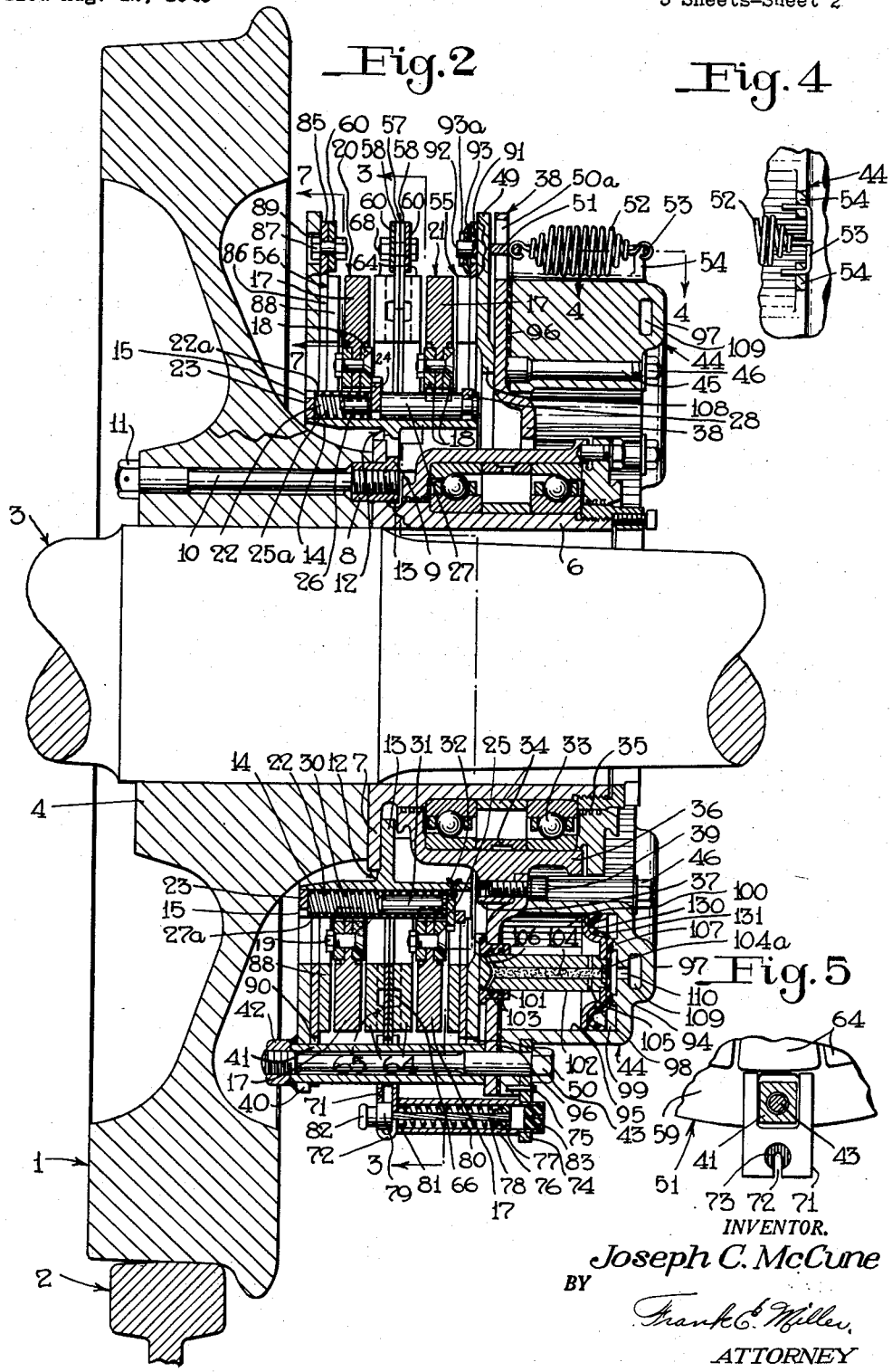
Figure 3:
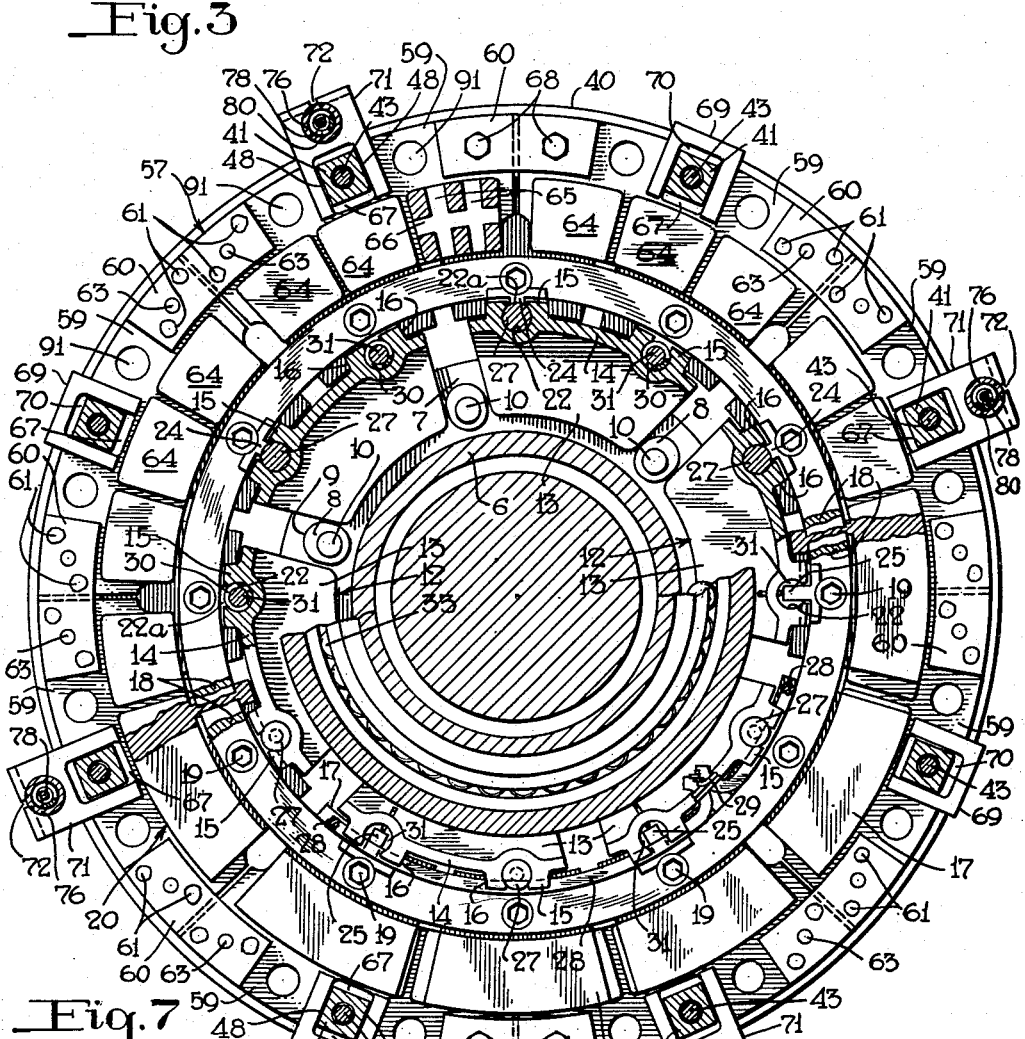
Figures 7, 8:
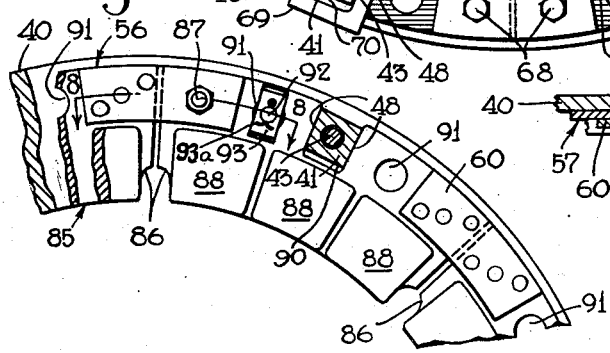

In the accompanying drawings: Fig. 1 is an end view of the improved brake apparatus shown applied around an axle to the inboard face of a railway vehicle wheel; Fig. 2 is a sectional view taken on the line 2—2 in Fig. 1; Fig. 3 is a sectional view taken on the line 3—3 in Fig. 2; Fig. 4 is a sectional view taken on the line 4—4 in Fig. 2; Fig. 5 is a face view of a portion of a brake element shown in section in Fig. 2; Fig. 6 is a sectional view taken on the line 6—6 in Fig. 1; Fig. 7 is a sectional view taken on the line 7—7 in Fig. 2; and Fig. 8 is a sectional view taken on the line 8—8 in Fig. 7.

DESCRIPTION

As shown in the drawing, 1 designates one wheel of a wheel and axle assembly of a railway vehicle truck adapted to roll on a rail 2, and 3 designates the axle of said assembly, the wheel 1 having a hub 4 in which one end of said axle is mounted. 5 designates a transom of the truck.

The disk brake mechanism embodying the invention comprises a cylindrical brake hub 6 mounted around the axle 3 in concentric relation therewith and provided at one end with an annular flange 7 the outer surface of which engages the inboard face of wheel hub 4 around said axle. The flange 7 is provided with a plurality of holes equally spaced apart and aligned with openings in the adjacent face of the wheel hub 4 (only one of said holes and openings being shown in the drawing), and disposed in each of these holes and extending into the aligned opening is a dowel 8. The outer face of each dowel 8 is provided with a head 9 for engaging flange 7 and said dowel is mounted on one end of a bolt 10 extending through the wheel hub 4 and having a nut 11 engaging the outboard face of the wheel hub, whereby the cylindrical brake hub 6 is rigidly secured to the wheel 1 for rotation therewith. The dowels 8 constitute means for

2 turning the brake hub 6 by and with the wheel 1 and for transferring braking torque from said hub to said wheel, the bolts 10 being subject only to tension stresses for holding the dowel 8 and brake hub 6 in cooperative relation with the wheel 1.

A plurality, preferably six, of combined rotor guide and driving lugs 12 are equally spaced from each other around the brake hub flange 7. Each lug 12 comprises a flange 13 projecting radially from the interior surface of an arcuate driving portion 14 formed concentric to the hub flange 7. The flanges 13 of the driving lugs are secured to the inboard face of the brake hub flange 7 preferably by welding. On the outer face of driving portion 14 of each lug 12 there are two ribs 15 arranged parallel to the axis of the brake hub 6 and thereby to the axis of wheel 1, said ribs being equally spaced from each other and from adjacent ribs 15 on the adjacent driving lugs 12. Each rib 15 has opposite, parallel and generally radially disposed side guide surfaces 16 extending parallel to the axis of the brake hub 6. Encircling the guide lugs 12 and slidably mounted on the ribs 15 thereof are two spaced apart brake rotors 20 and 21.

Each of the brake rotors 20 and 21 comprise a plurality of individual brake shoes 17, one for each of the plurality of ribs 15, each brake shoe being in the form of a segment of a disk and having a slot open to its interior edge in which the respective rib 15 is disposed with the sides of said slot in sliding contact with the guide surfaces 16 of the respective rib. Two individual rotor brake shoes 17 are thus mounted on each guide lug 12, there being twelve shoes 17 on the six lugs 12.

Each of the brake shoes 17 is provided in each of its opposite sides with a recess spaced from the respective rib 15 and arranged concentric of the brake hub 6 and encircling the driving lugs 12 and disposed in these recesses in all the shoes 17 are a pair of rings 18, one disposed at each side of the shoes. The two rings 18 are rigidly secured to opposite sides of the shoes 12, and the shoes are thus clamped between said rings, by bolts 19, each extending through both rings 18 and each shoe. In assembling the rotor the bolts 19 are not tightened until after all of the brake shoes 17 and rings 18 are in place in order to insure proper alignment of said shoes with the respective ribs 15.

It will now be seen that each of the brake rotors 20 and 21, comprises a plurality of brake shoes 17 secured in spaced apart relationship to each other and in cooperative relation with the driving lugs 12 by the rings 18 and that brake torque between said shoes and the wheel 1 will be transmitted from each individual shoe to the respective rotor driving lug 12 and thus be independent of the rings 18, said rings merely acting to hold said shoes assembled to the driving lugs 12. It will be further apparent that the two rotors 20 and 21 are slidable on the drive lugs 12 in a direction parallel to the axis of wheel 1, axle 3 and the brake hub 6.

In each of the ribs 15 there is a bore 22 extending parallel to the length of the rib between the opposite guide surfaces 16 thereof and opening through a slot 22a to the outer face of the rib. The end of each bore 22 adjacent to wheel 1 is closed by a plug 23. The ring 18 mounted on the side of rotor 20 opposite the wheel 1 is provided with a plurality of stop fingers 24 extending through the respective slot 22a into each of the alternate bores 22, while the corresponding ring of rotor 21 is provided with like fingers 25 extending into the other bores 22.

In each of the bores into which the fingers 24 project there is interposed between said finger and the respective plug 23 a rotor release spring 25a bearing at one end against said plug and at the opposite end against one side of a follower 26 slidably mounted in the bore and having its opposite side in contact with the respective finger 24. At the opposite side of each finger 24 there is a stop pin 27 which adjacent the end opposite the wheel 1 is provided with a circular recess arranged to align with a slot in the outer surface of the respective rib 15 at either side of slot 22a, and encircling the several guide lugs 13 within said slots therein and within the recesses of the several stop pins 27 is an expansible retainer ring 28 for holding the several stop pins 27 in place. The two ends of the ring 28 are bent inwardly and tied together by a wire band 29 for holding said ring against moving out of the slots by centrifugal force upon rotation of the driving lugs 12 with the wheel 1. The springs 25 are under pressure for urging the fingers 24 against the stop pins 27 which act to define the brake release position of rotor 20.

A release spring 30 is disposed in each of the bores 22 into which the fingers 25 of rotor 21 project. One end of each spring 30 is supported on the respective plug 23 while the opposite end bears against one side of a follower 31 the opposite side of which bears against the respective finger 25 which is adapted to engage ring 28. The several springs 30 are under pressure for, through the medium of fingers 25, urging the rotor 21 to a brake release position defined by contact between said fingers and the ring 28. A cotter key 32 is secured in the wall of each of the bores 22 into which the fingers 25 of rotor 21 project, adjacent the end of said bores opposite the plugs 23, for engagement by the respective spring followers 31 when the ring 28 and rotor 21 are removed from the drive lugs 12 to prevent said followers being moved out of said bores by springs 30. No means such as key 32 is required in the other slots for the followers 26 therein will still be in their bores upon full expansion of the respective springs 25a.

The brake hub 6 carries two anti-frictional bearings 33 held in spaced relation by spacers 34 and secured to said hub by a retainer nut 35 having screw-threaded engagement with the end of said hub. Mounted on these bearings and thereby journaled on the hub 6 is a bearing housing 36 provided around its exterior surface with a plurality of outwardly extending lugs 37. Encircling the housing 36 is a combined stator and brake cylinder supporting ring 38 rigidly secured around its inner edge to the lugs 37 by bolts 39, said ring being disposed at the side of rotor 21 opposite the wheel 1.

Disposed at the side of rotor 20 adjacent wheel 1 is a stator retaining ring 40 encircling the axle 3 and wheel hub 4 and in concentric relation therewith and with the stator and brake cylinder supporting ring 38. Rigidly secured at one end to the retaining ring 40 and projecting therefrom into contact with the adjacent surface of ring 38 are a plurality of tie bars 41 equally spaced from each other, and extending through the latter ring and through each of said bars and having screw-threaded engagement with a nut 42 secured to the ring 40 is a bolt 43 for rigidly securing the ring 40 to and for holding it in a predetermined spaced relation from the ring 38.

The tie bars 41 are preferably square in section having opposite parallel sides 48 arranged generally parallel to the radii of rings 38 and 40.

Mounted against the side of ring 38 opposite the ring 40 are two equally spaced apart substantially semi-circular brake cylinder devices 44 which are secured around their outer edge to the ring 38 by the bolts 43 and around their inner edge by a plurality of bolts 45 secured at one end to the ring 39 preferably by welding and having on their opposite end a nut 46 engaging the brake cylinder device.

Mounted against the stator and brake cylinder supporting ring 38 between said ring and rotor 21 is a pressure ring 49 having a plurality of spaced apart slots 50 open to the outer edge and in which the tie bars 41 are disposed with the sides of said slots in sliding contact with the sides 48 of said tie bars whereby said ring is slidable on said bars in a direction toward and away from said rotor. Projecting from the side of the pressure ring 49 opposite rotor 21 through suitable openings 50a in the brake cylinder and stator support ring 38 are spring anchors 51 to each of which is connected one end of a stator release spring 52. The opposite end of each spring 52 is connected to a wire bail 53 at its center, the opposite ends of each bail being bent parallel to the axis of the spring and being disposed in openings provided in webs 54 of the brake cylinder devices 44. The springs 52 are under tension for constantly pulling pressure ring 49 in the direction of the brake cylinder and stator support ring 38. The bails 53 are so arranged that by placing a finger at either side of their connection with springs 52 they can be removed from the brake cylinder webs 54 and then from the springs 52 to permit disassembling of the pressure ring 49 from the support ring 38, it being noted that the openings 50a are larger than the diameter of said springs to allow said springs to pass therethrough.

Disposed between the pressure ring 49 and rotor 21 is a non-rotatable brake element or stator 55, disposed between the rotor 20 and the stator retaining ring 40 is an identical but oppositely arranged non-rotatable brake element or stator 56, while between the rotors 20 and 21 is disposed a third non-rotatable brake element or stator 57.

The brake stator 57 comprises two relatively thin, flat-sided metal rings 58 each of which is made up of ring segments 59, corresponding in number to the eight tie bars 41, and arranged in substantial end to end relation. The segments 59 are rigidly secured together by bridge pieces 60 overlapping adjacent segments and secured thereto by welds 61 except at two diametrically opposite connections which are effected by bolts as will be hereinafter described. It will thus be seen that each stator ring 58 is built up in two separate and like semi-circular parts with one end of a bridge piece 60 at one end of each part over-lapping the end of the other part for connection by the bolt with the segment 59 at the opposite end of the other part. For simplicity of manufacture all of the segments 59 are of identical structure, as well as are the bridge pieces 60, in that all are provided with holes 63 for the reception of a bolt, to be hereinafter described, if used at the end of the two semi-circular parts of the ring.

Secured by welding to one side and adjacent to the inner edge of each segment 59 are three spaced apart friction brake shoes 64 for frictional braking contact with the adjacent braking face of rotor 20 or 21. Each of the brake shoes 64 is provided with two spaced radially extending air ducts 65 and a transverse air duct 66 cutting the radial ducts 65, said ducts being open to the face of the shoe adjacent the ring 58 and being provided to permit circulation of air currents to dissipate heat from the shoe incident to braking. Each of the ring segments 59 is also provided midway between its ends with a parallel sided slot 67 open to the outer edge thereof to receive one of the tie bars 41 upon all of which the stator 57 is mounted to slide axially.

The two rings 58 of the stator 57 are arranged back to back with the brake shoe 64 and bridge pieces 60 on the outer or opposite faces, and the two semi-circular parts of each ring are rigidly secured at each end to each other and to the corresponding parts of the other ring by two bolts 68 extending through the aligned holes 63 in the adjacent ring segments 59 and overlying ends of the respective bridge pieces 60, it being noted that while only one bolt 68 is required at each end to connect together two halves of either one of the rings that two bolts 68 are required for two rings arranged back to back as with stator 57.

A U-shaped clip 69 is fitted from the outer edges over each alternate, aligned pair of segments 59 of the two rings 58 and rigidly secured thereto by welding, a slot 70 being provided in each leg of the clip with opposite parallel sides aligned with the sides of the slots 67 in the respective segments 59 to provide a relatively wide bearing surface for sliding contact with the respective tie bar 41. Similar clips 71 are secured to the other aligned pairs of segments 59 of the two rings 58 for the same purpose, but the clips 71 also extend beyond the outer edge of the rings, and in the extending portion thereof each of these clips is provided with a slot 72 extending radially of the stator into the clip a chosen distance in one leg of the clip and to a bore 73 through the other leg.

The stator 57 is mounted between the rotors 20 and 21 with each of the tie bars 41 disposed in the aligned slots 67 of one pair of back to back arranged ring segments 59, said bars carrying said stator and having sliding contact with the side walls of said slots and with the legs of the respective clips 69 or 71, the bore 73 in the clips 71 being disposed at the side of the stator opposite the rotor 21.

Four removable lugs 74 aligned with the clips 71 are rigidly clamped to the outer webs 54 of the brake cylinder devices 44 by the bolts 43, a dowel pin 75 carried by said webs cooperating with said lugs for locating same. Secured at one end to the outer end of each lug 74 and projecting therefrom over and parallel to the respective tie bar 41 is a tubular stop element 76 the opposite end of which is arranged for contact by the respective clip 71 for limiting movement of the stator 57 in the direction away from wheel 1 and for therefore defining a brake release position of said stator. Slidably mounted in each stop element 76 is a plunger 77 secured to one end of a flexible cable 78 extending through said element into slot 72 in the respective clip 71 and connected at the opposite end to a button 79 disposed in hole 73 through the one leg of the respective clip 71 and engaging the other leg around the slot 72 therein. A spring 80 contained in each stop member 76 bears at one end against the plunger 77 while its opposite end is supported by a seat member 81 secured in the stop member 76 and through which the cable 78 extends. The springs 80 are under pressure and through the medium of the respective cables 78 and buttons 79 are adapted to act on the clips 71 for constantly pulling the rotor 57 to its brake release position.

With the buttons 79 disposed in the holes 73 of one leg of clips 71 it will be apparent that they are securely held therein by springs 80. Each button 79 is provided with an external knob 82 for a workman to grasp for pulling said button out of the hole 73 against the force of spring 80 and for then moving cable 78 outwardly through the slot 72 for disconnecting the button from the clip 71. The end of each stop element 76 opposite that provided for engagement by the respective clip 71 is closed by a plug 83 for preventing entrance of foreign matter into said stop.

The stator 56 comprises a ring 85 made up of segments 86 rigidly secured together into two semi-circular parts by welding of bridge pieces 60, the ends of the two parts being rigidly secured together to form a solid ring by a single bolt 87 at each end extending through the overlapping bridge piece 60 of one part and the ring segment 86 of the other part. The stator retainer plate 40 against which the stator 56 is shown abutted in the drawing is provided with suitable holes 89 (one being shown in the Fig. 1 of the drawings) for receiving the heads of bolts 87 which secure the two parts of the stator together. The segments 86 and bridge pieces 60 are identical to the segments 59 and bridge pieces 60 employed in the stator 57 except that said segments are made of slightly thicker metal.

Welded to the same side of each of the ring segments 86 as engaged by the bridge pieces 60 are three spaced apart brake shoes 88 which are identical to the brake shoes 64 on stator 59 except less the air ducts 65 and 66.

Each ring segment 86 has a slot 90 open to the outer edge for receiving one of the tie bars 41, which bars coacting with all of the segments 86 support the stator in working relation with the adjacent rotor 20 and hold it against rotation relative to the retaining plate 40.

The segments 59 and 86 of the stators 57, 56 are preferably punched from sheet metal on the same press, and at each side of the slot 67, 90 therein there is provided a hole 91. These holes 91 have no function in the stator 57, but in the stator 56 four of these holes, equally spaced apart, are adapted to receive lugs 92 welded at one end to the retainer ring 40 and which extend through the holes. Mounted over each of the lugs 92 against ring 85 is a spring washer 93 which is held under compression against the ring 85 by a cotter key 93a extending through the lug. The purpose of this construction is to hold the stator 56 against chattering on the retainer ring 40 when the stator 57 is out of contact with the adjacent rotor 20.

The stator 55 is the same in construction as stator 56, but reversely arranged, with its ring segments 86 connected with the tie bars 41 for holding the stator against turning relative to said bars, and lugs 92 projecting from the pressure ring 49 through the holes 91 in said segments and carrying spring washers 93 and cotter keys 93a are provided for holding said stator against said pressure ring against chattering thereon.

The two brake cylinder devices 44 may be identical, oppositely arranged, and somewhat less than semi-circular structures, one located above and the other below a horizontal plane including the axis of axle 1. Each of the brake cylinder devices comprises six equally spaced apart cylinders 94 the bores 95 of which (only one being shown in the drawing) are open at one end to the adjacent face of the stator and brake cylinder supporting ring 38, with a gasket 96 interposed between said ring and the adjacent end of said cylinders for excluding foreign matter from the bores 95.

Slidably mounted in each of the bores 95 is a piston 98 between which and an integral cover 97 for the opposite end of said bore there is provided a pressure chamber 99. At the opposite side of piston 98 is a non-pressure chamber 100. Projecting from the piston 98 through the non-pressure chamber 100 and through a bushing 101, pressed into a bore through the stator and brake cylinder supporting ring 38, is a piston rod 102 the end of which, opposite that connected to piston 98, contacts the adjacent face of the pressure ring 49. The bushing 101 carries two sealing rings 103 having sealing and sliding contact with the peripheral surface of piston rod 102 for preventing entrance of foreign matter along said rod to the non-pressure chamber 100.

An axial bore 104 in rod 102 is open at one end through a plurality of radial ports 105 to the non-pressure chamber 100 and at the opposite end is open through one or more diagonally arranged ports 106 to the opposite side of the sealing rings 103 and thence to atmosphere through clearance space around the end of said rod and between the bushing 101 and pressure ring 49. The axial bore 104 is filled with air cleaning material to filter foreign matter from air which may enter the non-pressure chamber 100 therethrough upon reciprocation of piston 98 in bore 95. The brake cylinder piston 98 comprises a piston head 130 rigid with the end of rod 102, and a flexible packing cup 131 mounted on said head and having sliding contact with the wall of bore 95, and beneath said cup a plug 104a is loosely disposed in a counterbore in the end of rod 102 closing the end of bore 104. Removal of the packing cup 131 from the piston head 130 and then removal of plug 104a permits initial filling of bore 104 with air cleaning material and subsequent renewal thereof, if necessary.

A brake release position of the brake cylinder piston 98 is adapted to be defined by engagement of said piston with a stop lug 107 provided on cover 97, and in this position, the release position of the pressure ring 49 may be defined either by engagement of said ring with the bushing 101 or engagement of an outturned flange 108 at the inner edge of said ring with the stator and brake cylinder support ring 38.

The brake cylinder cover 97 is provided with a raised portion containing an air passage 109 extending over the several cylinder bores 95 and open to each of said bores by a passage 110. At opposite ends of the brake cylinder device the passage 109 turns outwardly and one end is closed by a removable cover 111. The opposite end of passage 109 in each brake cylinder device 44 is closed by a removable fitting 112 having a side outlet 113 adapted to be connected by a flexible pipe 114 to the corresponding outlet in the fitting 113 of the other brake cylinder device. Each of the fittings 112 secured to the two brake cylinder devices is also provided with a second outlet one of which is closed by a plug 115 while the other is connected to a brake cylinder pipe 116 adapted to be connected to any conventional brake controlling valve device.

In operation, assuming that pipe 116 and thereby the several brake cylinder pressure chambers 99 in both brake cylinder devices 44 are open to atmosphere, the several springs 52 connected to pressure ring 49 will hold the flange 108 of said ring in contact with the support ring 38 and thereby hold the several brake cylinder pistons 98 in substantial contact with their stop rib 107, thereby positioning both said pistons and the stator 55, which is secured from movement with the pressure ring 49, in the brake release position. With the stator 55 thus positioned the springs 30 will move the rotor 17 to its brake release position in which it is shown in the drawing spaced away from the stator 55, and the springs 80 connected to the center stator 58 and springs 25 acting on rotor 20 will position said stator and rotor in their brake release position as shown in the drawing and in which they are disengaged from the brake elements at either side thereof.

Now in order to render the brake mechanism effective to brake wheel 1 fluid under pressure will be supplied to pipe 116 from which it will flow into the brake cylinder pressure chambers 99 in both brake cylinder devices 44. When the pressure of fluid thus obtained in chambers 99 and acting on the pistons 98 in opposition to springs 52 becomes increased to a degree sufficient to overcome said springs, said pistons, through the medium of rods 102, will slide the pressure ring 49 and thereby the associated stator 55 along the tie bars 41 into contact with the rotor 21. Further movement of the pistons 98 will then slide rotor 21 along ribs 15 on the guide lugs 12 into contact with the central stator 57 and then slide said stator along the tie bars 41 into contact with the rotor 20 which then will be moved along said ribs into contact with the end stator 56, the several stators being thus urged into frictional contact with the opposite sides of the two rotors 20 and 21 which will create a drag on said rotors to effect braking of wheel 1 to a degree determined by the pressure of fluid provided in the brake cylinder pressure chambers 99. Any desired degree of braking of wheel 1 may be obtained by providing the proper pressure of fluid in the brake cylinder pressure chambers 99, as will be apparent.

When it is desired to release the brakes fluid under pressure will be released from pipe 116 and thereby from the several piston chambers 99, whereupon the springs 52 will return the pressure ring 49, and thereby the stator 55 and the several brake cylinder pistons 98 to their release positions, during which movement, springs 80, 30 and 25a will return the stator 57 and the rotors 20, 21 to their brake release positions in which they are shown in the drawing and in which they are disengaged from each other, in order to permit free turning of the wheel 1.

To secure the stators 55, 56 and 57 against rotation, in order that they may effect braking of the rotors 20 and 21 and thereby of the wheel 1, as just described, two torque cables 120 and 121 are provided.

The stator and brake cylinder support ring is provided with two outwardly extending torque lugs 122 and 123 one located above the axle 3 and the other below. One end of cable 120 is connected to lug 122 by a shear pin 124 while the corresponding end of cable 121 is connected to lug 123 by a shear pin 125. The opposite ends of the two cables 120 and 121 are connected to a pin 126 having a greater resistance to shear than pins 124 and 125. The pin 126 is carried by a channel 127 rigidly secured to the truck transom 5.

When, as viewed in the Fig. 1, the brake is applied to wheel 1 at the time it is turning in a counter-clockwise direction the cable 120 will be effective to hold the stators 55, 56, 57 and brake cylinder devices 44 against rotation, so that braking of the wheel may be obtained upon operation of said brake cylinder devices.

The cable 121 is similarly effective upon rotation of wheel 1 in a clockwise direction. The shear pins 124 and 125 have adequate resistance to shear to insure that the stators and brake cylinder devices will be held against rotation under a maximum degree of braking of wheel 1, or, in other words, under all conditions of intended brake operation, but if the force required to hold the stators and brake cylinder devices against rotation would become excessive, as in case of a frozen bearing 33 or any other failure which would lock the stators and brake cylinder devices for rotation with the axle 3, said shear pins are adapted to fail, first one and then the other depending upon the direction or rotation of the wheel, in order that the brake mechanism as a whole may rotate with the wheel.

In case of failure of shear pins 124 and 125, as just described, it would be undesirable to have the cables 120 and 121 drop to a position where the free ends might become fouled along the track, as in a switch, and to avoid this a support 128 is secured to the underside of the channel 127 for limiting downward movement of the adjacent end of said cables to a degree where the opposite ends will be held above the track.

In order to provide a desired amount of slack in the cables 120 and 121 when the brake apparatus is applied to a vehicle the channel 127 is provided with a hole 129 somewhat above and slightly further away from the brake apparatus than the hole to which the pin 126 is shown applied in the drawing and which is employed during operation of the brake. In applying the brake apparatus to a truck the pin 126 will initially be placed in the hole 129 and the channel 127 will be adjusted vertically on the transom 5 to a position in which the cables 120 and 121 will be taut between said pin and the shear pins 124 and 125, following which said channel will be welded to said transom. The pin 126 will then be removed from hole 129 and placed in the position in which it is shown in the drawing to provide the desired slack in the two cables.

Railway vehicles are usually provided with hand operated means for applying the brakes thereon for holding the vehicle against movement when the brake equipment is void of fluid under pressure. The brake apparatus embodying the invention is adapted to be applied adjacent each wheel of a vehicle, that is, there will be two of the brakes to each wheel and axle assembly of the vehicle. For hand braking of the vehicle it is however proposed to brake only one wheel and axle assembly of the car and to this end I have provided means adapted to be associated with the brake apparatus adjacent each wheel of said wheel and axle assembly operable by hand for braking said assembly and thereby the vehicle.

The hand operated means for actuating the brake apparatus at each wheel of the one wheel and axle assembly comprises two oppositely arranged brackets 132, one disposed between each of the two opposite ends of the brake cylinder devices 44 and secured by welding to the stator and brake cylinder device supporting ring 38. Each of these brackets has a bore arranged at right angles to the braking surfaces of the brake rotors and the stators substantially midway between the inner and outer peripheral edges of the brake shoes thereon, and slidably mounted in each of these bores and extending through an aligned bore in the ring 38 is a brake applying pin 133, it being noted that there are two of these pins for each brake apparatus and that they are located diametrically opposite each other with respect to said brake rotors and stators.

One end of each pin 133 is adapted to engage the adjacent face of the pressure ring 49 while the opposite end is connected by a link 134 to one end of a secondary lever 135 fulcrumed at its opposite end on a pin 136 carried by two spaced arms 137 forming a part of bracket 132, the end of lever 135 being disposed between said arms. The connection between the link 134 and lever 135 comprises a pin 138 carried by the lever and extending through a slot 139 in said link, this end of the lever also having a rounded surface 140 for contacting the end of pin 133, the slot 139 providing for direct contact between surface 140 on the lever and the end of pin 143 for moving the pin in the direction for effecting inter-engagement of the several brake rotors and stators in the same manner as when operated by the brake cylinder pistons 98. The pin 138 and link 134 constitute means for withdrawing the pin 133 to permit movement of the rotors and stators to their brake release position as hereinbefore described.

Encircling and carried by a shaft 141 secured in each bracket 132 is a torsion spring 142 anchored at one end in the bracket, as at 143, while the opposite end bears against the lever 135 for urging said lever and thereby the pin 133 to the position in which they are shown in the drawing to permit movement of the brake rotors and stators to their brake release position. Above the pin 141 a fulcrum pin 144 extends between two spaced apart arms 145 of the bracket 132 and disposed between these arms and fulcrumed on said pin 144 is a primary brake lever 146, in substantially the form of a bell crank, carrying at one end a pin 147 which engages the side of lever 135 opposite the pusher pin 133, while at the opposite end there is provided a journal bearing 148.

Fulcrumed on the bearing 148 of the primary brake lever 146 at one side of the brake apparatus is a conventional type dead brake lever 149, while fulcrumed on the bearing 147 of the other primary brake lever at the opposite side of the brake apparatus is a conventional type live brake lever 150. One end of the dead brake lever 149 is connected by a cable 151 to the truck transom 5 while its opposite end is connected by a cable 152 to the lower end of the live brake lever 150. The other end of the live brake lever 150 is adapted to be connected by a clevis 153 to a hand operated brake staff or wheel (not shown) on the vehicle.

Upon hand operation of the brake shaft or wheel the live lever 150 will be rocked in a counter-clockwise direction on the primary brake lever bearing 148, as viewed in Fig. 1, and through the medium of cable 152 will actuate the dead lever 148 to, at the same time, move the bearings 148 of both primary brake levers 146 toward each other. This operation of the two primary brake levers 146 will in turn actuate the respective pusher pins 133 to move the rotors and stators of the brake apparatus into frictional inner-engagement for braking the vehicle wheel 1 for thereby holding the vehicle at rest. Upon release of the brake staff and therefore of force to clevis 153 and the live lever 150 the torsion springs 142 will return the secondary brake levers 135, primary brake levers 146, the live brake lever 150 and the dead brake lever 149 to the position in which they are shown in the drawing, this position of the primary brake levers 146 being defined by engagement of said levers with a stop surface 154 on the respective brackets 132, whereby the brakes on the wheel 1 will be released.

The portion of each secondary brake lever 135 engaged by the pin 147 in the primary brake lever 146 in operating said lever to apply brakes is in the form of a curved surface designated by the reference numeral 155. The curvature of surface 155 is so related to the curved surface 148 on the end of the lever 135 which engages the pusher pin 133 as to maintain a substantially constant leverage between the primary brake lever 146 and said pusher pin 133 for all positions of said primary brake lever.

MAINTENANCE

Barring accident, the only parts of the brake apparatus which will ever require replacement are the stators 55, 56 and 57, the rotor brake shoes 17 and possibly the packing cups 131 in the brake cylinder devices 94. In order to renew the brake cylinder packing cups all that is necessary is to remove the nuts 46 from bolts 45 and to remove the bolts 43 whereupon the brake cylinder device 44 may be removed from the stator and brake cylinder carrying ring 38. With the brake cylinders 44 thus removed the brake cylinder pistons 98 can be pulled from their cylinders and new packing cups applied. If at this time it is deemed desirable to renew the air cleaning material in bore 104 of the piston rods 102 the plug 104a under the packing cup 131 closing the adjacent end of said bore can be removed to accomplish this end. With the brake cylinder devices removed from the supporting ring 38 the seals 103 may be renewed if desired.

In order to replace any one of the stators 55, 56 or 57 or to renew the brake shoes 17 in the rotors 20, 21, the bolts 43 extending through the tie bars 41 will be removed as well as the bearing retainer nut 35 whereupon the brake cylinder devices 44 and the support ring 38 therefore may be moved back on the axle 3 away from the other parts of the brake apparatus.

The pressure ring 49 and connected stator 55 can then be pulled off the tie bars 41 and the stator removed from said ring and replaced with a new stator. In order to renew the shoes on rotor 21 all that is then necessary is to remove the bolts 19 securing the rotor rings 18 to opposite sides of said shoes whereupon said shoes can be replaced.

In order to renew the stator 57 it will be necessary to cut the wire band 29 holding together the adjacent ends of ring 28 and then remove said ring from the rotor drive lugs 12, whereupon the rotor 21 can be removed and in turn the stator 57 and rotor 21. The stator 57 can then be removed from the axle by removal of bolts 68 and replaced by a new stator, and if desirable the shoes 17 of the rotor 20 can be renewed in the same manner as the shoes of rotor 21. Also, the stator 56 can then be replaced if desirable following which all the parts can be reassembled in the reverse order.

SUMMARY

It will now be seen that I have provided a disk brake apparatus which is rugged and relatively simple in construction involving a minimum of parts and which will require a minimum of maintenance and the wear parts of the apparatus are readily accessible for repair or replacement.

Having now described the invention, what I claim as new and desire to secure by Letters Patent, is:

1. Means for moving a non-rotatable brake element of a disk brake apparatus to a brake release position comprising in combination with said non-rotatable brake element, a non-rotatable structure carrying said non-rotatable brake element, means carried by said structure for moving said non-rotatable brake element relative thereto to a brake applying position, means carried by said structure for engagement by said non-rotatable brake element to define a brake release position thereof, and a plurality of means for moving said brake element to said brake release position each comprising a spring anchored at one end to said structure, flexible means connected at one end to the opposite end of said spring, a member associated with said non-rotatable brake element having a bore closed at one end and a slot open through one side of said bore at the closed end thereof to receive said flexible means, and a button-like element secured to the opposite end of said flexible means arranged to enter and engage the closed end of said bore to render said spring effective to urge said non-rotatable member into contact with said member and movable manually against said spring and out of said bore to remove said flexible means from said slot.

2. Means for moving a non-rotatable brake element of a disk brake apparatus to a brake release position comprising in combination with said non-rotatable brake element, a non-rotatable structure carrying said non-rotatable brake element, means carried by said structure for moving said non-rotatable brake element relative thereto to a brake applying position, a plurality of hollow tube-like elements spaced around and carried by said structure for engagement by said non-rotatable brake element to define a brake release position thereof, a spring in each of said elements, and means connecting each of said springs to said non-rotatable brake element for rendering the spring effective to move said non-rotatable brake element to its brake release position comprising clip means secured to said non-rotatable brake element and having two spaced apart portions, a bore extending through one of said portions, a slot extending into the other portion in alignment with said bore, a button disposed in said bore in contact with said other portion, and a flexible cable connecting the respective spring to said button.

3. Means for moving a non-rotatable brake element of a disk brake apparatus to a brake release position comprising in combination with said non-rotatable brake element, a non-rotatable structure carrying said non-rotatable brake element, means carried by said structure for moving said non-rotatable brake element relative thereto to a brake applying position, a plurality of springs spaced around and connected at one end to said non-rotatable brake element for moving it to its brake release position, and means connecting the opposite end of each of said springs to said structure comprising a bail having two parallel legs disposed in bores in said non-rotatable structure and connected between said legs to said spring.

4. A disk brake mechanism for a member to be braked comprising interleaved rotatable and non-rotatable brake elements movable into frictional interengagement to effect braking of said member and movable out of interengagement to brake release positions, means connecting said rotatable elements for rotation with said member, a non-rotatable structure arranged in coaxial relation to and at one side of said brake element comprising means for holding said non-rotatable brake element against rotation and providing for movement thereof into and out of interengagement with said rotatable elements, actuating means carried by said structure for actuating said elements into interengagement, and means operable upon release of said actuating means for moving two of said non-rotatable brake elements to their brake release positions comprising, for one of said two non-rotatable brake elements, a plurality of springs spaced around and connected at one end to the brake element, a bail for each of said springs having parallel legs disposed in bores in said actuating means and connected at its center to the respective spring for rendering it effective to move the respective non-rotatable brake element to its brake release position, and comprising for the other of said two non-rotatable brake elements a plurality of spring means spaced around and carried by said non-rotatable structure, a flexible cable connected at one end to each of said spring means, a U-shaped clip for each of said spring means projecting from the edge of the respective stator and having in one leg a bore and having a slot extending through both legs to said bore, and a button connected to said cable and disposed in said bore in contact with the other leg of said clip for rendering said spring means effective and movable manually out of said bore to release said cable from said clip for rendering said spring means ineffective.

5. A disk brake apparatus for a rotatable member comprising a rotatable braking element secured for rotation therewith, a non-rotatable brake element for frictionally engaging said rotatable brake element and movable out of such engagement to a brake release position, brake cylinder means for moving said non-rotatable brake element into engagement with said rotatable brake element, a non-rotatable structure, support means for said non-rotatable brake element, a plurality of bolts securing said support means and brake cylinder means to said non-rotatable structure, stop means carried by each of said bolt means for engagement by said non-rotatable brake element to define its brake release position, a spring associated with each stop means anchored at one end thereto, and finger releasable means connecting the opposite end of each spring to said non-rotatable brake element.

6. A disk brake apparatus comprising a rotatable member to be braked, a rotatable friction brake element secured for rotation with said member, a non-rotatable brake element for frictionally engaging said rotatable brake element for braking said member, a non-rotatable structure carrying said non-rotatable brake element, and torque means for holding said non-rotatable structure and non-rotatable brake element against rotation comprising a shear pin connecting said torque means to said non-rotatable structure and anchor means for said torque means having greater resistance to shear than said shear pin.

7. A disk brake for a wheel and axle assembly of a railway vehicle truck comprising a rotatable friction brake element secured for rotation with said assembly, a non-rotatable brake element arranged for frictional engagement with said rotatable brake element for braking said assembly, a non-rotatable structure carrying said non-rotatable brake element, a pair of flexible torque cables, two shear pins connecting, respectively, one end of said cables to spaced apart portions of said non-rotatable structure, and a pin connecting the opposite ends of said cables to a fixed part of said truck, the last named pin having a greater resistance to shear than either of said shear pins.

8. A disk brake for a wheel and axle assembly of a railway vehicle truck comprising a rotatable friction brake element secured for rotation with said assembly, a non-rotatable brake element arranged for frictional engagement with said rotatable brake element for braking said assembly, a non-rotatable structure carrying said non-rotatable brake element, a pair of flexible torque cables, two shear pins connecting, respectively, one end of said cables to spaced apart portions of said non-rotatable structure, a pin having greater resistance to shear than said shear pins connecting the opposite ends of said cable to a fixed part of said truck, and means associated with said fixed part of the truck for supporting said flexible cables in a position to clear the track for said assembly upon shearing of said shear pins.

9. A disk brake apparatus for a wheel and axle assembly of a railway vehicle truck having a transom and comprising a rotatable brake element secured for rotation with said assembly, a non-rotatable brake element for frictionally engaging said rotatable brake element to brake said assembly, support structure carrying said non-rotatable brake element, a pair of shear pins connected to spaced apart portions of said support structure, a pair of flexible torque cables, one connected to each of said shear pins, a bracket secured to said transom having two holes, one spaced from said supporting structure a greater distance than the other, and a pin of greater shear strength than said shear pins adapted to connect the opposite ends of said torque cables to said one hole upon assembling said brake apparatus to said truck and to the other hole after assembling to thereby gauge slack in said cables with the pin in said other hole.

10. A disk brake apparatus for a rotatable member to be braked comprising an annular rotatable braking element secured for rotation with said member, an annular non-rotatable brake element movable into and out of frictional engagement with said rotatable brake element, a supporting structure for said non-rotatable brake element, a plurality of axially movable pins carried by said supporting structure for urging said non-rotatable brake element against said rotatable brake element, individual lever means for actuating each of said pins in the direction for moving said non-rotatable brake element into engagement with said rotatable brake element, means for actuating all of said lever means in unison, and release spring means carried by said non-rotatable structure for actuating said pins in the opposite direction.

11. A disk brake apparatus for a rotatable member to be braked comprising an annular rotatable braking element secured for rotation with said member, an annular non-rotatable brake element movable into and out of frictional engagement with said rotatable brake element, a supporting structure for said non-rotatable brake element, a pair of pins carried by diametrically opposite portions of said supporting structure engaging said supporting structure, and lever means for each of said pins including a bellcrank one end of which is arranged for actuating the respective pin in a direction for moving said non-rotatable brake element into contact with said rotatable brake element, a spring for each lever means for actuating same and the respective pin in the opposite direction, a lever journaled at its center on the opposite end of each of said bell-cranks, means providing a fixed fulcrum for one end of one of said levers, means connecting the other of said one lever to one end of the other lever, and means for actuating the other end of said other lever in a direction for operating both of said levers and thereby both of said bell-cranks in unison to move said non-rotatable brake element into frictional engagement with said rotatable brake element.

12. A disk brake apparatus for a rotatable member to be braked comprising an annular rotatable braking element secured for rotation with said member, an annular non-rotatable brake element movable into and out of frictional engagement with said rotatable brake element, a supporting structure for said non-rotatable brake element, a plurality of axially movable pins carried by said supporting structure for urging said non-rotatable brake element against said rotatable brake element, a pair of axially movable pins carried by diametrically opposite portions of said supporting structure for urging said non-rotatable brake element against said rotatable brake element, a dead brake lever having a fixed fulcrum at one end, a live brake lever operatively connected at one end to the opposite end of said dead lever, means pivotally connected to center portions of said dead and live levers for actuating both of said pins upon operation of said live lever by force applied to the opposite end thereof, and releasing spring means for relieving said rotatable element of pressure from said non-rotatable element upon relief of said force on said live lever.

JOSEPH C. McCUNE.

References Cited in the file of this patent

UNITED STATES PATENTS

| Number | Name | Date |
|---|---|---|
| 2,218,614 | McCune | Oct. 22, 1940 |
| 2,243,334 | Eksergian | May 27, 1941 |
| 2,246,214 | McCune et al. | June 17, 1941 |
| 2,255,024 | Eksergian | Sept. 2, 1941 |
| 2,277,106 | Hewitt | Mar. 24, 1942 |
| 2,295,797 | McCune et al. | Sept. 15, 1942 |
| 2,308,890 | McCune | Jan. 19, 1943 |
| 2,451,326 | Eksergian et al. | Oct. 12, 1948 |
| 2,452,369 | Gravenhorst et al. | Oct. 26, 1948 |
| 2,457,834 | Ricketson | Jan. 4, 1949 |
| 2,485,082 | Bachman | Oct. 18, 1949 |